(12) United States Patent
Stephenson et al.

(10) Patent No.: US 6,288,788 B1
(45) Date of Patent: Sep. 11, 2001

(54) PRINTER USING LIQUID CRYSTAL DISPLAY FOR CONTACT PRINTING

(75) Inventors: Stanley W. Stephenson, Spencerport; Thomas J. Quattrini, Byron, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/954,797

(22) Filed: Oct. 21, 1997

(51) Int. Cl.[7] ....................................................... H04N 1/00
(52) U.S. Cl. .............................................. 358/1.11; 355/78
(58) Field of Search ................................ 395/111; 345/87, 345/88, 102; 348/761, 766, 790; 355/32, 78, 38, 40, 81

(56) References Cited

U.S. PATENT DOCUMENTS

| | | |
|---|---|---|
| 4,811,089 | 3/1989 | Kiser et al. . |
| 4,935,820 | 6/1990 | Patel et al. . |
| 5,337,068 * | 8/1994 | Stewart et al. .......................... 345/88 |
| 5,760,882 * | 6/1998 | Gulick, Jr. et al. ..................... 355/80 |
| 5,860,036 * | 6/1999 | Stephenson .......................... 396/429 |

* cited by examiner

Primary Examiner—Mark Zimmerman
Assistant Examiner—Lance W. Sealey
(74) Attorney, Agent, or Firm—Raymond L. Owens

(57) ABSTRACT

A contact printer including a liquid crystal display (LCD) for presenting an image for printing; a supply adapted to contain at least one sheet of photosensitive media; and a structure for pressing the photosensitive media sheet from the supply against the LCD. The printer further includes electronics for driving the LCD for causing an image to be presented against a pressed photosensitive sheet for contact printing of such image.

5 Claims, 2 Drawing Sheets

US 6,288,788 B1

PRINTER USING LIQUID CRYSTAL DISPLAY FOR CONTACT PRINTING

CROSS REFERENCE TO RELATED APPLICATIONS

The present invention is related to commonly assigned U.S. patent application Ser. No. 08/824,694 (75543) filed Apr. 8, 1997, entitled "Printing Variable Density Pixels" to Stanley W. Stephenson. The disclosure of this related application is incorporated herein by reference.

FIELD OF THE INVENTION

The present invention relates to the printing of images produced from Liquid Crystal Displays (LCDs). More specifically, the present invention relates to contact printing using Liquid Crystal Displays.

BACKGROUND OF THE INVENTION

It is known to print on light sensitive media using a liquid crystal display as a shutter. Typically, the image bearing surface of a LCD is optically focused onto a sheet bearing a light sensitive emulsion. A source of light is provided behind the LCD to illuminate an image on the surface of the LCD. When color images are being produced, the media supports three types of color-sensitive chemistries that form the color image. It is further known to use a display to create color images using a monochrome LCD and various colors of light. The monochrome LCD is sequentially loaded with separated color planes of a source image, and the corresponding light is used to illuminate a color printing media U.S. Pat. No. 4,811,089 discloses the use of a linear electrostatic head or ink jet head to write separate color records to an electrostatic mask. Red, green and blue light sources are then used to illuminate each mask to expose color-sensitive media.

U.S. Pat. No. 4,935,820 uses a white light source to illuminate a LCD. The LCD carries color separate information, and a dichroic mirror is used to provide the appropriate light color for each separation. Because the dichroic mirror absorbs the other two unused portions of the white light, the system is energy inefficient. This patent, '820, is used to expose media with very low light sensitivity, which is stated as ". . . in the range of 103 ergs/c$^2$ to 107 ergs/cm$^2$." Such a media requires a very high output light source such as ". . . a 220 watt Tin Halide Arc Lamp type SN 220 manufactured by Phillips." In addition, the LCD must also se high-efficiency liquid crystals, specifically called out as a smectic liquid crystal.

U.S. Pat. No. 5,337,068 discloses the use of a monochrome LCD, and a multiple sets of red, green and blue lamps to create color images on the monochrome display. Separate color information is written to multiple areas simultaneously at a rapid rate to project all three colors through common pixels. Appropriate lamps are activated simultaneously in separate areas as data are written to each area. Multiple lamps are required for each color of the separate areas and multiple lamps are energized simultaneously during display. An optic is needed to focus an image onto the light-sensitive media It is known to focus emitted light from the image display onto the light sensitive sheet. Such optics are expensive, and require space for operation of the optical element. It would be advantageous to eliminate the need for an optical element between the display and the light receiving media. It would be useful to create a small, inexpensive printer to print images. Such a printer could be battery powered and portable.

SUMMARY OF THE INVENTION

It is an object of the present invention to create a highly efficient, high effective and compact printer of digital images. It is a further object of the present invention to produce a printer which is portable.

These objects are achieved by a contact printer comprising:

a) a liquid crystal display (LCD) for presenting an image for printing;

b) supply means adapted to contain at least one sheet of photosensitive media;

c) means for pressing the photosensitive media sheet from the supply against the LCD; and d) means for driving the LCD for causing an image to be presented against a pressed photosensitive sheet for contact printing of such image.

ADVANTAGES

A feature of this invention is that costly optic elements are eliminated and the volume of the printer is reduced. Another feature of this invention is that the printer can be made compact and thus portable. The printer uses a display having a structure that permits direct printing onto a light sensitive media.

DETAILED DESCRIPTION OF THE INVENTION

Figure 1:
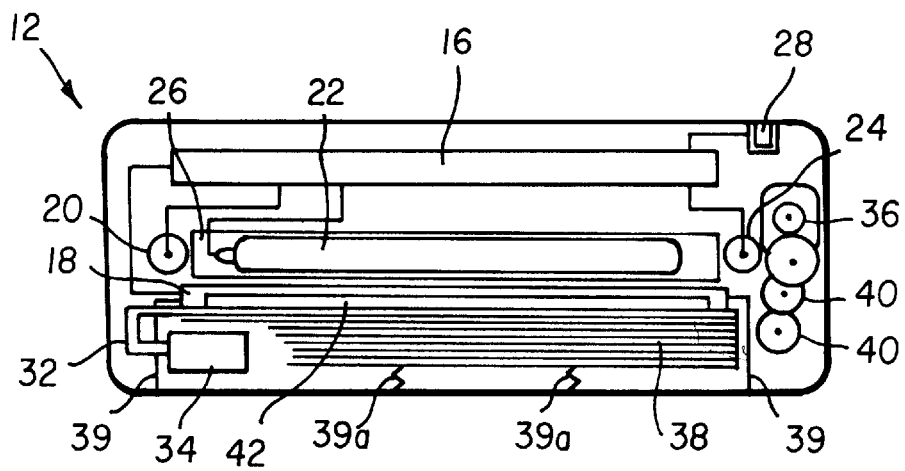
FIG. 1 is a top sectional view of a printer in accordance with the present invention.

The invention is directed to a compact printer used in conjunction with electronic cameras. Such a printer must be small, light and energy efficient to provide portability. Turning now to FIG. 1, a top sectional view of the printer 12 is shown. The operation of printer 12 is controlled by printer electronics 16. Printer link 28 provides for communication to other apparatus, such as an electronic camera that stores digital images. Printer link 28 can be a two-connection serial port, an infrared sensor or other standard communication interfaces. An image is received, processed and printed by printer electronics 16.

Figure 2:
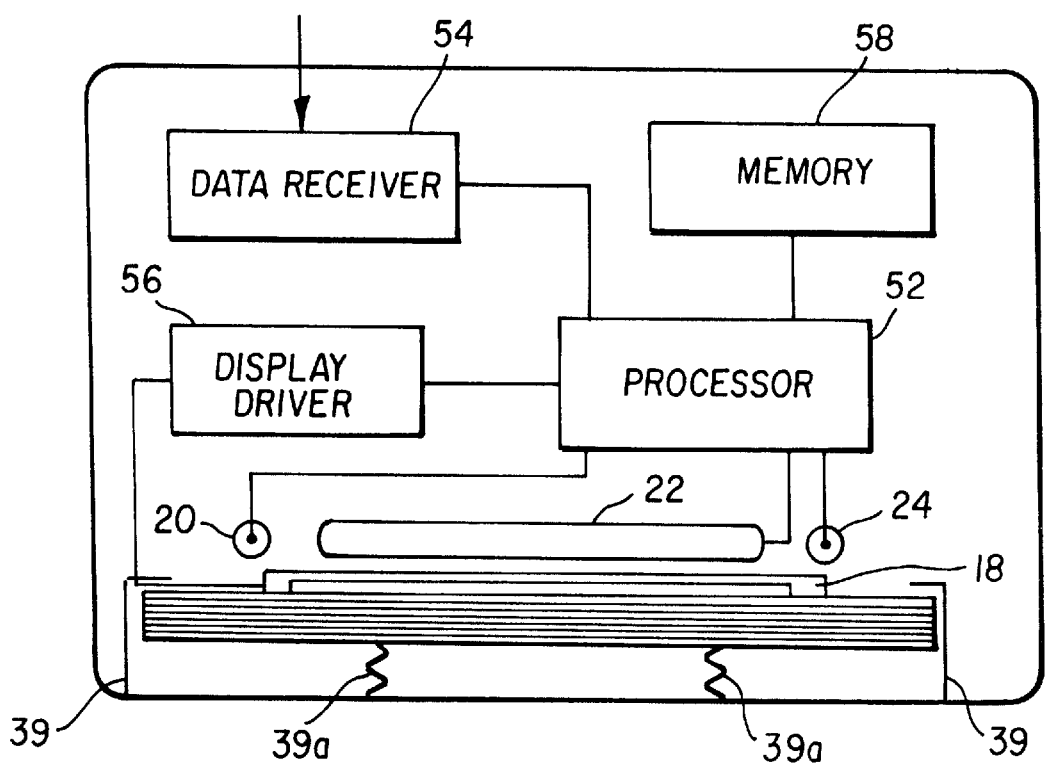
FIG. 2 is an electrical schematic of the printer of FIG. 1 in accordance with the present invention.

FIG. 2 is an electrical schematic of part of printer electronics 16 and shows the transfer of an image from a data stream to a print. Data is received by data receiver 54, and is operated on by processor 52. Processor 52 stores a received image in memory, 50. Processor 52 transmits the image in memory 50 through display driver 56 to LCD 18. The LCD 18 is driven to present an image to be presented against a pressed photosensitive sheet for contact printing of such image.

LCD 18 is a monochrome display such as Sharp Corp. model LM64P101. Display 18 has 640 horizontal square pixels in 480 vertical lines on 0.23 millimeter spacing to form a display having a 7.43 inch diagonal. This LCD display is currently used to display black and white data. In the present invention, data are loaded in parallel units of 8 bits that represent on and off conditions for each pixel. The display is written in 38,400 8 bit words in 11.7 milliseconds. Data can be written to the display by a method set forth in above identified co-pending U.S. patent application Ser. No. 08/824,694. Data for a given color plane are written 256 times, each time representing an increased exposure time. At the end of the 256 times, a continuous tone color plane will be written from the source image data.

Figure 3:
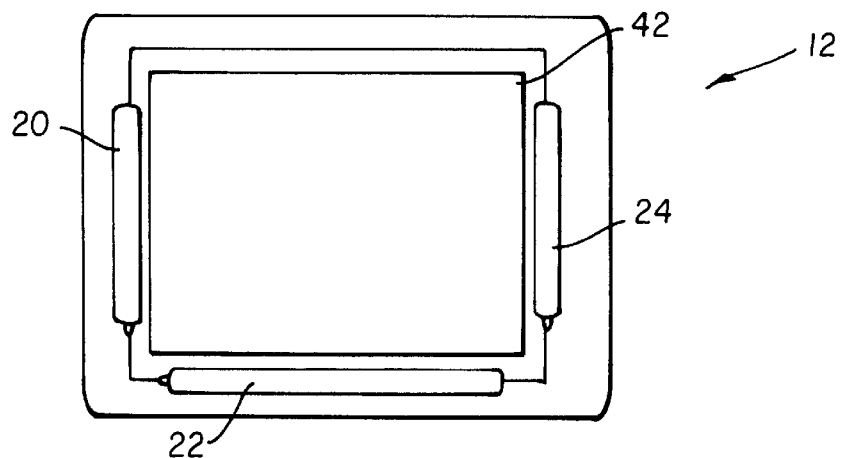
FIG. 3 is a front sectional view showing portions of the printer in FIG. 1.

During the writing process, LCD display 18 is sequentially illuminated by one of three separate lamps; red fluorescent lamp 20, green fluorescent lamp 22 and blue fluorescent lamp 24 which are disposed around integrating bar 26. The fluorescent lamps are individually and sequentially actuated by processor 52 for each color plane. One integrating bar 26 can be used for all three lamps 20, 22, and 24 if the lamps are disposed around three of the sides of integrating bar 26 as shown in FIG. 3. Each lamp is oriented to emit a specific color of light into integrating bar 26.

Fluorescent lamps 20, 22 and 24 are conventional fluorescent lamps using an ultra-violet (254 nm) glow discharge from an excited mercury vapor. Phosphor coatings on the inside of the lamps support phosphors that emit in one of the three primary colors red, green and blue. Lamp 20 emits red fluorescent light and can be Harison lamp HMB4-150B, doped with the "R" phosphor. Such a lamp is 4.1 mm in diameter, 150 mm long and emits 8000 candela/m$^2$. Lamp 22 has the same part number and dimensions but is coated with "G" phosphors to emit green light. Similarly, lamp 24 is the same mechanical package and part number, but coated with the "B" phosphor to emit blue light.

Using phosphors dedicated to a single color in each lamp permits the energy delivered to a lamp to be concentrated on the emission of a single color required for a given printed color plane of the image. Using multiple lamps for each color as in U.S. Pat. No. 5,337,068 requires many more lamps, and more energy will be used than using a unitary lamp for each color. If one or more white light lamps are used, ⅔ of the energy is wasted by filtering out the other two colors. Energizing three separate lamps at separate times for each of three separate color planes reduces power requirements and provides sufficient illumination to permit the development of a portable, battery powered printer. The processor 52 drives the LCD 18 and sequentially controls the colored light sources for causing three separate color images to be presented against a pressed photosensitive sheet 42 for contact printing of such image.

Figure 4:
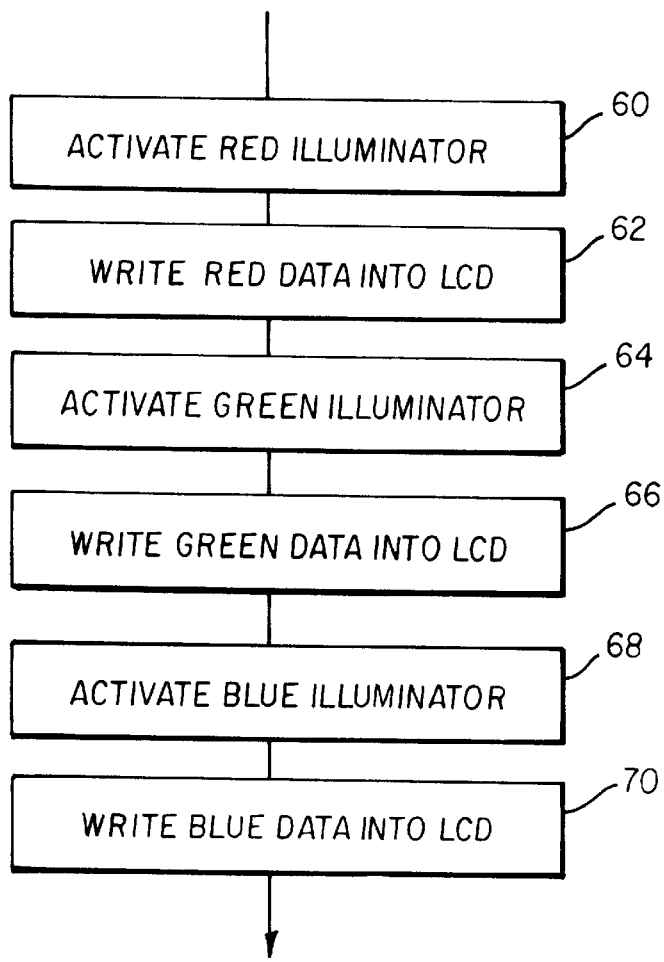
FIG. 4 is a flow chart of the operation of the printer in FIG. 1.

FIG. 4 is a flow chart of the process that is used to create a print according to the present invention. In step one, 60, processor 52 turns on red fluorescent lamp 20. In step two, 62, processor 52 writes red image data to liquid crystal display 18 from memory 50. In step three, 64, processor switches illumination power to green fluorescent lamp 22. In step four, 66, processor loads green data into liquid crystal display 18 from memory 50. In step 5, 68, processor 52 switches illumination power to blue fluorescent lamp 24. In step six, 70, processor 52 writes blue image data to liquid crystal display 18. The sequential illumination for specific colors reduces peak power demand on the printer. Processor 52 writes the color plane associated with the illuminant color to liquid crystal display 18.

Printer 12 is provided with a supply structure 39 which contains a stack of photosensitive media sheets 38 to receive the image illuminated on LCD display 18. These sheets are light sensitive and are loaded into the camera and stored in light sensitive manner as is known in the art. Springs 39a continuously urge the supply and hence the stack of photosensitive sheets to move such that the top photosensitive sheet 42 of the media sheet stack 38 is pressed against the LCD. Photosensitive sheets can be found in current art as instant silver halide sheets or pressure sensitive microencapsulated crushable color particles such as disclosed in U.S. Pat. Nos. 4,768,050; 5,049,902; and 5,122,432. Alternatively, images can be stored on photographic film and then stored and chemically processed at a later time.

In an experiment, light sensitive instant media, specifically Polaroid 600 media was pressed directly to liquid crystal display 18 and an exposure made to determine the resolution of LCD 18 without an optic. The resulting image was well focused, with a minimum of blurring between adjacent pixels. This is due to the fact that the Sharp Corp. LM64P101 display is a common twisted-nematic (TN) design. Polarizers on either side of the liquid crystals are used to permit light of a given polarity to pass through LCD 18. Liquid crystals within the display are electrically directed to vary the polarity of light passing through the liquid crystal material. When the crystals are in a first state, light passes through the display in an alternative state, light is blocked. Modulating light at each pixel varies the intensity of each pixel.

Such displays generate highly collimated beams of light from each pixel of light emitted by LCD 18. The glass substrate to the front of the display is relatively thin, so that the surface of the front of the display is relatively well focused. Using a display with relatively large pixels, such as the 0.23 mm pixels on the Sharp display permits the elimination of a focusing optic. The image does have some light bleed between adjacent pixels. This is not a problem if the display has a significantly greater resolution than the image being printed. For instance the 640 by 480 pixel resolution of the display is more than suitable for lower resolution images such as a 320 by 240 pixel image. As a general rule, pixel size, pixel count, degree of light collimation, and the front cover thickness of LCD 18 can be selected to permit contact printing from the display using lower-resolution images.

After the exposure process, exposed photosensitive sheet 42 is urged by picker 32 using picker drive 34 into processing rollers 40 under the control of printer electronics 16. Processing rollers 40 are driven by roller drive 36 under control of printer electronics 16 and receive urged photosensitive sheet 42. Processing rollers 40 or other means are used to apply pressure to photosensitive sheet 42 to process and stabilize the latent image on the surface of photosensitive sheet 42.

In the case of silver halide imaging, a pod of chemicals at the beginning of photosensitive sheet 42 is burst by processing rollers 40. The chemicals are spread across the image of photosensitive sheet 42 as photosensitive sheet 42 passes through processing rollers 40. Said chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

The invention has been described in detail with particular reference to certain preferred embodiments thereof, but it will be understood that variations and modifications can be effected within the spirit and scope of the invention.

PARTS LIST 12 printer
16 printer electronics

18 LCD display
20 red fluorescent lamp
22 green fluorescent lamp
24 blue fluorescent lamp
26 integrating bar
28 printer link
32 picker
34 picker drive
36 roller drive
38 stack of media sheets
39 supply structure
39a springs
40 processing rollers
42 photosensitive sheet
50 memory
52 processor
54 data receiver
56 display driver
60 step one
62 step two
64 step three
66 step four
68 step five
70 step six

What is claimed is:

1. A contact printer, comprising:

a liquid crystal display (LCD) for presenting an image for printing;

supply means adapted to contain at least one sheet of photosensitive media;

means for pressing the photosensitive media sheet from the supply against the LCD; and means for driving the LCD for causing the image to be presented to the pressed photosensitive sheet for contact printing of the image.

2. A contact printer, comprising:

a liquid crystal display (LCD) for presenting an image for printing;

supply means adapted to contain a stack of photosensitive media sheets;

means for moving the stack of photosensitive media sheets so as to press one of the sheets against the LCD; and means for driving the LCD for causing the image to be presented to the pressed photosensitive sheet for contact printing of the image.

3. A contact printer, comprising:

a liquid crystal display (LCD) for sequentially presenting three separate images for printing;

separate sources of colored light, each such light source providing illumination to the LCD to present a different colored image of a scene;

supply means having at least one photosensitive media sheet;

means for pressing the photosensitive media sheet from the supply against the LCD; and means for driving the LCD and for sequentially controlling the colored light sources for causing the three separate color images to be presented to the pressed photosensitive sheet for contact printing of the color images.

4. A contact printer, comprising:

a liquid crystal display (LCD) for sequentially presenting three separate images for printing;

separate sources of colored light, each such light source providing illumination to the LCD to present a different colored image of a scene;

supply means for containing a stack of photosensitive media sheets;

means for moving the stack of photosensitive media sheets so as to press one of the sheets against the LCD; and means for driving the LCD and for sequentially controlling the colored light sources for causing the three separate color images to be presented to the pressed photosensitive sheet for contact printing of the images.

5. A contact printer, comprising:

a liquid crystal display (LCD) producing an image when driven;

a photosensitive media pressed against the LCD; and a display driver driving the LCD, causing the image to be recorded by the photosensitive media and contact printing the image.

* * * * *